US006741369B1

(12) United States Patent
Beisswenger

(10) Patent No.: US 6,741,369 B1
(45) Date of Patent: May 25, 2004

(54) METHOD FOR THE OPERATING AN ENGRAVING MEMBER

(75) Inventor: Siegfried Beisswenger, Preetz (DE)

(73) Assignee: Hell Gravure Systems GmbH, Kiel (DE)

( * ) Notice: Subject to any disclaimer, the term of this patent is extended or adjusted under 35 U.S.C. 154(b) by 0 days.

(21) Appl. No.: 09/445,121

(22) PCT Filed: May 27, 1998

(86) PCT No.: PCT/DE98/01445

§ 371 (c)(1),
(2), (4) Date: Feb. 17, 2000

(87) PCT Pub. No.: WO98/55305

PCT Pub. Date: Dec. 10, 1998

(30) Foreign Application Priority Data

Jun. 3, 1997 (DE) ........................................ 197 23 184

(51) Int. Cl.[7] ............................ H04N 1/40; B44C 1/22; B44B 1/00; B44B 3/00; B44B 11/00; B41C 1/04

(52) U.S. Cl. ...................... 358/3.29; 358/3.29; 358/3.3; 358/3.31; 358/3.32; 101/32; 101/150; 101/170

(58) Field of Search ................................ 358/299, 3.29, 358/406, 3.32, 3.3, 3.31, 1.9; 382/325; 101/150, 170, 3.1–32, 401.1; 219/68–70; 409/86-91; 700/159–195; 425/458; 144/144.1

(56) References Cited

U.S. PATENT DOCUMENTS

| | | | | | |
|---|---|---|---|---|---|
| 2,773,163 | A | * | 12/1956 | Boyajean | 425/458 |
| 4,004,924 | A | * | 1/1977 | Vrancken et al. | 430/325 |
| 4,095,633 | A | * | 6/1978 | Kimball et al. | 144/144.1 |
| 4,297,060 | A | * | 10/1981 | Ross | 409/86 |
| 4,532,863 | A | * | 8/1985 | Bavoux et al. | 101/153 |
| 5,431,024 | A | * | 7/1995 | Hobelsberger | |
| 6,523,467 | B2 | * | 2/2003 | Fangmeyer et al. | |
| 6,627,385 | B2 | * | 9/2003 | Hiller et al. | 430/306 |
| 6,634,286 | B1 | * | 10/2003 | Carstens | 101/3.1 |
| 2004/0007143 | A1 | * | 1/2004 | Baxter | 101/327 |

FOREIGN PATENT DOCUMENTS

| | | | | |
|---|---|---|---|---|
| DE | 10287 | | 4/1975 | B41C/1/04 |
| DE | 2508734 | * | 8/1976 | B41C/1/04 |
| EP | 0 710 550 | | 5/1996 | B41C/1/045 |
| FR | 72.18469 | | 2/1973 | |
| JP | 11207934 | * | 3/1999 | B41F/33/00 |
| WO | WO9419900 | * | 9/1994 | H04N/1/00 |

* cited by examiner

*Primary Examiner*—Kimberly Williams
*Assistant Examiner*—Melanie Vida
(74) *Attorney, Agent, or Firm*—Schiff Hardin LLP

(57) ABSTRACT

In a method for operating an engraving member in an electronic engraving machine to engrave printing forms, especially printing cylinders for intaglio printing, a stylus of the engraving member is controlled by an engraving signal and engraves a sequence of cups arranged in a gravure screen in the rotating printing cylinder. The engraving signal is formed by superimposing the image signal representing the tone gradations to be engraved. In order to obtain good quality engraving, the engraving member is heated to a temperature that is close to operating temperature before engraving starts and/or during an interruption of engraving. For this purpose, the engraving member is driven with a periodic signal whose frequency is preferably located inside the ultrasonic range in order to avoid noise disturbances.

7 Claims, 1 Drawing Sheet

METHOD FOR THE OPERATING AN ENGRAVING MEMBER

BACKGROUND OF THE INVENTION

The invention is in the field of electronic reproduction technology and is directed to a method for the operation of an engraving element in an electronic engraving machine for engraving printing forms, particularly printing cylinders, for rotogravure.

In an electronic engraving machine, for example, an electromagnetic engraving element having an engraving stylus as a cutting tool moves along a rotating printing cylinder in an axial direction. The engraving stylus controlled by an engraving signal cuts a sequence of depressions, called cups, arranged in a raster into the generated surface of the printing cylinder. The engraving signal is formed from the superimposition of an image signal representing the gradations between "black" and "white" with a periodic raster signal. Whereas the raster signal effects a vibrating lifting motion of the engraving stylus for generating the raster, the image signal—in conformity with the gradations to be reproduced—controls the depths of the cups engraved into the generated surface of the printing cylinder.

Given an electromagnetic engraving element, the drive system for the engraving stylus is essentially composed of a stationary electromagnet driven with the engraving signal in whose air gap the armature of a rotational system moves. The rotational system—other than the armature—comprises an armature shaft, a shaft bearing and a damping mechanism. One end of the armature shaft is designed as a resilient torsion rod clamped stationarily in space, whereas the other end carries a lever-like stylus holder for the engraving stylus.

As a result of the engraving signal, an alternating magnetic field is generated in the electromagnet that exerts electrical torques onto the armature that are opposed by the mechanical torque of the torsion rod. The alternating electrical torques cause a vibratory motion of the armature shaft from the quiescent attitude defined by the torsion rod by angles that are proportional to the amplitudes of the engraving signal. As a result of the vibratory movement of the armature shaft, the stylus holder together with the engraving stylus executes lifting motions directed onto the generated surface of the printing cylinder that define the penetration depths of the engraving stylus into the generated surface of the printing cylinder.

The alternating magnetic field in the electromagnet generates alternating current losses in the armature that are dependent on the frequency of the raster signal. The alternating current losses heat the armature, the armature shaft and the stylus holder together with the engraving stylus slowly from an initial temperature at the start of engraving up to a stable operating temperature during engraving. The heating causes an expansion of the armature shaft and of the stylus holder as well as a modification of the magnetic permeability of the pole shoe iron of the electromagnet and of the armature.

At traditional frequencies of the raster signal (engraving frequencies), the temperature changes between the initial temperature at the start of engraving and the stable operating temperature as well as given interruptions in engraving are so slight that the expansion and permeability changes caused by the heating do not disadvantageously influence the quality of the engraved cups.

In practice, there is a demand for shorter engraving times or, respectively, for higher engraving speeds. In order to achieve these demands, the circumferential speed of the printing cylinder, the axial feed rate of the engraving element and the engraving frequency must be raised.

Since a disprotionately high electrical power is required for operating an engraving element at a higher engraving frequency, greater temperature changes arise due to a higher operating temperature, these potentially leading to inadmissible expansion and permeability changes and, thus, to the engraving of faulty cups.

SUMMARY OF THE INVENTION

It is therefore an object of the present invention to improve a method for the operation of an engraving element in an electronic engraving machine for engraving printing forms, particularly printing cylinders, for rotogravure such that disturbing temperature changes are avoided, in order to thereby achieve a good engraving quality.

According to the method of the invention for operation of an engraving element in an electronic machine for engraving a printing cylinder for rotogravure, before a start of engraving and/or during an engraving interruption, heating the engraving element in order to achieve a good engraving quality. An engraving stylus of the engraving element controlled by an engraving signal then engraves a sequence of cups arranged in a raster onto the rotating printing cylinder. The engraving signal is formed of a superimposition of an image signal representing gradations to be engraved with a periodic raster signal for generating the raster. The engraving element executes a feed motion along the printing cylinder proceeding at an axial direction of the printing cylinder for planar engraving of the cups.

DESCRIPTION OF THE PREFERRED EMBODIMENT

Figure 1:
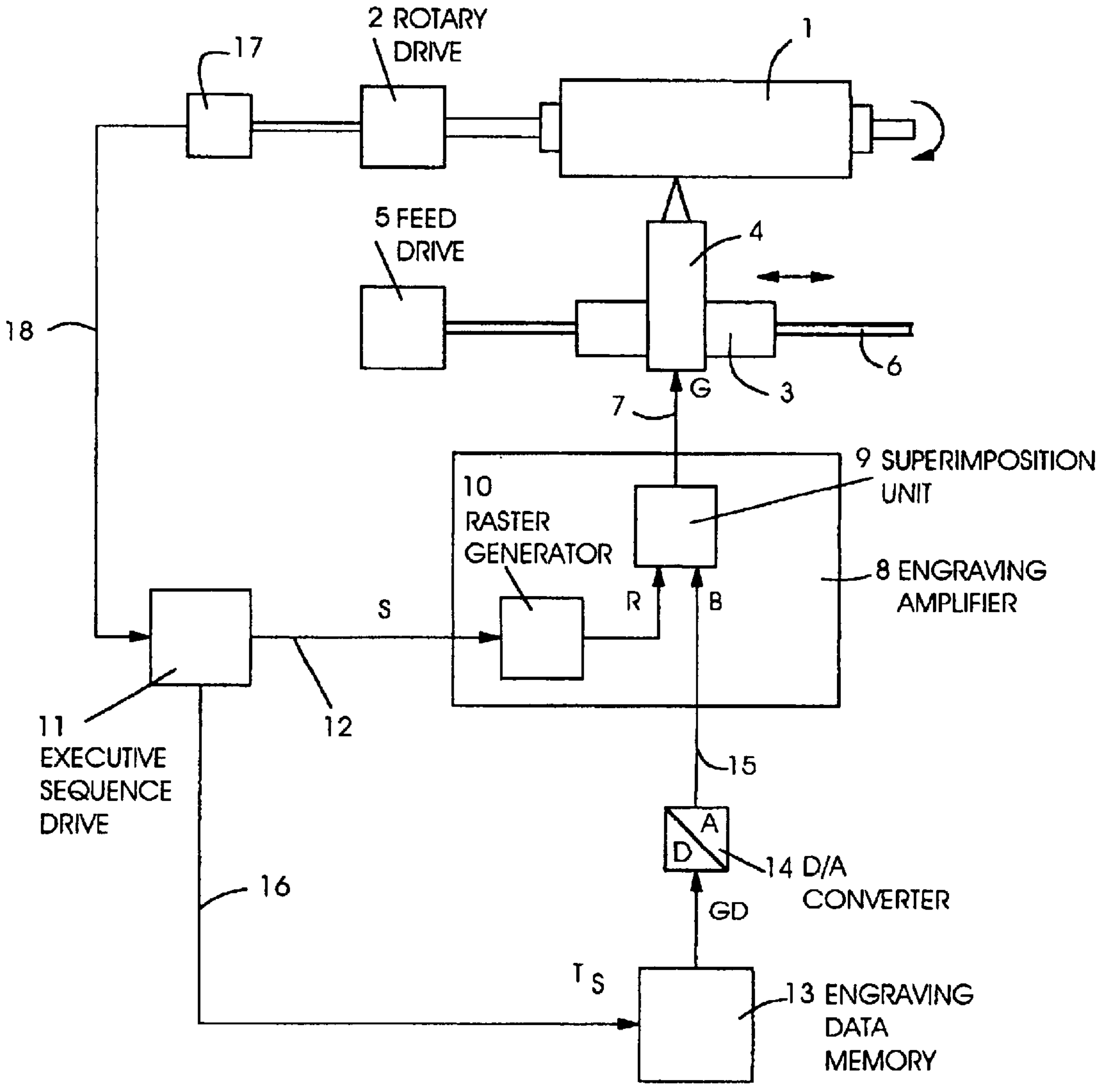
FIG. 1 shows a schematic block circuit diagram of an engraving machine for engraving printing cylinders.

A printing cylinder is rotationally driven by a rotatory drive. An engraving element having an engraving stylus as cutting tool and mounted on an engraving carriage moves along the rotating printing cylinder in an axial direction with the assistance of a spindle driven by a feed drive.

The engraving element in the exemplary embodiment is an electromagnetic engraving element having an electromagnetic drive system for the engraving stylus. An electromagnetic drive system was already explained in detail in the introduction to the specification and is known, for example, from DE 23 36 089 A. The drive system for the engraving stylus, however, can also be designed solid-state actuator element, being designed of an electrostrictive, piezocrystalline or of a magnetostrictive material.

The engraving stylus of the engraving element controlled by an engraving signal (G) on a line 7 cuts a sequence of cups arranged in a raster into the generated surface of the rotating printing cylinder engraving line by engraving line while the engraving element moves axially along the printing cylinder in steps.

The engraving signal (G) is formed in an engraving amplifier 8 by superimposition of a periodic raster signal (R), also called vibration, with analog image values (B) that represent the gradations of the cups to be engraved between "black" and "white", being formed in a superimposition unit 9. A raster generator 10 edits the periodic raster signal (R) whose frequency is switchable on the basis of a control signal (S). The control signal (S) is generated in an executive sequence controller 11 and is supplied to the raster generator via a line.

Whereas the periodic raster signal effects a vibrating lifting motion of the engraving stylus for generating the raster, the analog image values (B) determine the penetration depths of the engraving stylus into the generated surface of the printing cylinder according to the gradations to be engraved.

The engraving data are deposited in an engraving data memory engraving line by engraving line in the sequence required for the engraving of the printing cylinder. An engraving datum having at least one byte is allocated to each cup to be engraved, this engraving datum containing, among other things, the gradation between "black" and "white" to be engraved as engraving information.

The engraving data (GD) are acquired, for example, by point-by-point and line-by-line, opto-electronic scanning of a master to be reproduced in a scanner and are then deposited in the engraving data memory (13).

When engraving the printing cylinder 1, the engraving data (GD) are read out from the engraving data memory with a read clock sequence $T_s$ and are converted into the analog image values (B) in an A/D converter, said image values being supplied to the engraving amplifier via a line.

The read clock sequence $T_s$, whose frequency corresponds to the single or multiple frequency of the raster signal, is likewise generated in the executive sequence controller and proceeds via a line to the engraving data memory. The executive sequence controller is synchronized with the rotational movement of the printing cylinder in that a pulse generator mechanically coupled to the rotatory drive supplies a synchronization signal to the executive sequence controller via a line.

For eliminating the problems cited in the introduction to the specification, it is inventively proposed to heat the engraving element before the start of engraving and/or during engraving interruptions such that the stable operating temperature is already approximately reached at the start of engraving and/or does not drop significantly during engraving interruptions.

The heating of the engraving element can occur in that it is driven with the existing, periodic raster signal before the start of engraving and/or during engraving interruptions. Since the engraving frequency lies in the audible range in practice and the rotational system of the engraving element vibrates with the engraving frequency, however, noise burdens can arise.

The noise burdens can be significantly reduced when the engraving element is charged with a periodic signal for heating at the start of engraving and/or during engraving interruptions, the frequency thereof being higher than the engraving frequency and being selected such that the rotational system only vibrates with a low amplitude, i.e. no longer follows the frequency of the periodic signal due to its mass. Disturbing noises can nonetheless still occur due to elastic deformations of parts of the drive system.

For heating the engraving element, a periodic signal is therefore advantageously employed whose frequency lies in the ultrasound range, amounting, for example, to 20 kHz.

By driving the engraving element with a periodic signal having ultrasound frequency, the rotational system vibrates with such a slight amplitude that the sound emission is advantageously highly reduced and is no longer audible. On the other hand, the periodic signal with ultrasound frequency assures the required heating of the armature and of the armature shaft of the engraving element to the operating temperature due to eddy current losses arising in the armature.

Since the eddy current losses given excitation with an ultrasound frequency are significantly higher than given an excitation with the engraving frequency during the engraving, a significantly lower electrical power than that required for the engraving is required for the heating of the engraving element before the start of engraving and/or in engraving pauses.

The raster signal generated in the raster generator (10) can preferably be employed as periodic signal, the frequency thereof being switched by the control signal (S) from the engraving frequency during engraving to the higher frequency, preferably to the ultrasound frequency, before the start of engraving and/or during engraving interruptions.

Although various minor changes and modifications might be proposed by those skilled in the art, it will be understood that my wish is to include within the claims of the patent, warranted hereon all such changes and modifications as reasonably come within my contribution to the art.

I claim:

1. A method for operation of an engraving element in an electronic engraving machine for engraving a printing cylinder for rotogravure, comprising the steps of:

before at least one of a start of engraving and during an engraving interruption, heating the engraving element in order to achieve a good engraving quality by substantially reducing heat induced permeability changes and dimension changes affecting the engraving element;

forming an engraving signal of a superimposition of an image signal representing gradations to be engraved with a periodic raster signal for generating the raster;

then engraving with an engraving stylus of the engraving element controlled by an engraving signal a sequence of cups arranged in a raster into the rotating printing cylinder; and executing with the engraving element a feed motion along the printing cylinder proceeding in an axial direction of the printing cylinder for the engraving the cups.

2. The method according to claim 1 wherein the engraving element is heated approximately to an operating temperature of the engraving element during engraving before at least one of the start of engraving and during the engraving interruption.

3. A method for operation of an engraving element in an electronic engraving machine for engraving a printing cylinder for rotogravure, comprising the steps of:

before at least one of a start of engraving and during an engraving interruption, heating the engraving element in order to achieve a good engraving quality;

forming an engraving signal of a superimposition of an image signal representing gradations to be engraved with a periodic raster signal for generating the raster;

then engraving with an engraving stylus of the engraving element controlled by an engraving signal a sequence of cups arranged in a raster into the rotating printing cylinder;

executing with the engraving element a feed motion along the printing cylinder proceeding in an axial direction of the printing cylinder for the engraving of the cups; and the engraving element being driven with the periodic raster signal for heating before at least one of the start of engraving and during engraving interruption.

4. A method for operation of an engraving element in an electronic engraving machine for engraving a printing cylinder for rotogravure, comprising the steps of:

before at least one of a start of engraving and during an engraving interruption, heating the engraving element in order to achieve a good engraving quality;

forming an engraving signal of a superimposition of an image signal representing gradations to be engraved with a periodic raster signal for generating the raster;

then engraving with an engraving stylus of the engraving element controlled by an engraving signal a sequence of cups arranged in a raster into the rotating printing cylinder;

executing with the engraving element a feed motion along the printing cylinder proceeding in an axial direction of the printing cylinder for the engraving of the cups; and the engraving element being driven with the periodic signal for heating before at least one of the start of engraving and during the engraving interruption, a frequency thereof being selected at least so high that the engraving element oscillates only with a low amplitude that greatly reduces a sound emission.

5. The method according to claim 4 wherein the engraving element is driven with the periodic signal for heating before at least one of the start of engraving and during the engraving interruption, a frequency thereof lying in an ultrasound range, as a result whereof sound emissions are no longer audible.

6. The method according to claim 4 wherein the raster signal is employed as periodic signals; and a frequency of the raster signal is modified before at least one of the start of engraving and during the engraving interruptions from the engraving frequency to a higher frequency.

7. A method for operation of an engraving element in an electronic engraving machine, comprising the steps of:

heating the engraving element in order to achieve a good engraving quality by substantially reducing heat induced permeability changes and dimension changes affecting the engraving element;

forming an engraving signal of a superimposition of an image signal representing gradations to be engraved with a periodic raster signal for generating a raster; and executing with the engraving element an engraving proceeding in an axial direction of the printing cylinder for planar engraving of the cups.

* * * * *